(12) United States Patent
Inose

(10) Patent No.: US 10,711,849 B2
(45) Date of Patent: Jul. 14, 2020

(54) SLIDE FLANGE

(71) Applicant: GKN Driveline Japan Ltd, Tochigi, Tochigi (JP)

(72) Inventor: Hideyuki Inose, Tochigi (JP)

(73) Assignee: GKN Automotive Ltd., Birmingham, West Midlands (GB)

( * ) Notice: Subject to any disclaimer, the term of this patent is extended or adjusted under 35 U.S.C. 154(b) by 30 days.

(21) Appl. No.: 16/168,992

(22) Filed: Oct. 24, 2018

(65) Prior Publication Data

US 2019/0055997 A1 Feb. 21, 2019

Related U.S. Application Data

(63) Continuation of application No. PCT/JP2016/069418, filed on Jun. 30, 2016.

(51) Int. Cl.
*F16D 27/14* (2006.01)
*F16H 48/24* (2006.01)
(Continued)

(52) U.S. Cl.
CPC ............ *F16D 27/14* (2013.01); *F16H 48/24* (2013.01); *F16H 48/32* (2013.01); *F16H 48/40* (2013.01);
(Continued)

(58) Field of Classification Search
CPC .... F16D 27/14; F16D 27/108; F16D 2300/18; F16D 27/18; F16H 48/40; F16H 48/32; F16H 48/24; F16H 2048/204
See application file for complete search history.

(56) References Cited

U.S. PATENT DOCUMENTS 8,926,471 B2 * 1/2015 Yamanaka ............... F16H 48/22
475/331
9,989,140 B2 * 6/2018 Onitake .................. F16D 27/09
(Continued)

FOREIGN PATENT DOCUMENTS

CN 201732009 U 2/2011
CN 202809173 U 3/2013
(Continued)

OTHER PUBLICATIONS

Extended European Search Report for EP16907287 dated Oct. 24, 2019 (8 pages).
(Continued)

*Primary Examiner* — David J Hlavka
(74) *Attorney, Agent, or Firm* — Bejin Bieneman PLC

(57) ABSTRACT

A slide flange is used with a rotary body having a clutch rotatable about an axis and a pair of proximity sensors apart from each other in a circumferential direction. The slide flange is comprised of: an inner ring portion fitting on the rotary body and movable in a direction along the axis from a first position where the clutch gets connected to a second position where the clutch gets disconnected; an outer ring portion unitarily elongated from the inner ring portion and so disposed as to at least at the second position face the pair of proximity sensors; a plurality of notches formed on the outer ring portion at even intervals in the circumferential direction; and a coupling portion elongated from the outer ring portion toward the rotary body, the coupling portion being so coupled with the clutch as to rotate the outer ring portion along with the clutch.

5 Claims, 7 Drawing Sheets

(51) Int. Cl.
*F16H 48/32* (2012.01)
*F16H 48/40* (2012.01)
F16D 27/108 (2006.01)
F16H 48/20 (2012.01)

(52) U.S. Cl.
CPC ...... *F16D 27/108* (2013.01); *F16H 2048/204* (2013.01)

(56) References Cited

U.S. PATENT DOCUMENTS

| | | | |
|---|---|---|---|
| 2007/0197338 A1 | 8/2007 | Fusegi | |
| 2013/0237363 A1* | 9/2013 | Fusegi | F16H 48/24 475/230 |
| 2017/0254400 A1* | 9/2017 | Onitake | F16H 48/24 |

FOREIGN PATENT DOCUMENTS

| | | |
|---|---|---|
| JP | 2006046594 A | 2/2006 |
| JP | 2007218406 A | 8/2007 |
| JP | 2008203130 A | 9/2008 |
| JP | 2009019880 A | 1/2009 |
| JP | 2010084930 A | 4/2010 |
| WO | 2015030899 A1 | 3/2015 |
| WO | 2015078488 A1 | 6/2015 |

OTHER PUBLICATIONS

International Search Report and Written Opinion for PCT/JP2016/069418 dated Sep. 13, 2016 (9 pages; with English translation).

* cited by examiner

SLIDE FLANGE

CROSS-REFERENCE TO RELATED APPLICATIONS

This application is a continuation Application of PCT International Application No. PCT/JP2016/069418 (filed Jun. 30, 2016), the entire contents of which are incorporated herein by reference.

BACKGROUND

A drivetrain in a vehicle includes a number of elements, and some of them are comprised of clutches. One example thereof is a free-running differential. A free-running differential is a kind of differential that allows differential motion between right and left axles, and is comprised of a clutch that controls transmission and interruption of torque. When the clutch gets disconnected, one set of axles is capable of freely rotating and then the torque is transmitted only to another set of axles so that the vehicle runs in the 2WD (two-wheel-drive) mode. When the clutch gets connected, as the free-running differential transmits the torque also to the axles at issue, the vehicle runs in the 4WD (four-wheel-drive) mode. Specifically, the free-running differential is one of options for realizing a part-time 4WD vehicle.

Whether the clutch is connected or disconnected is often determined depending on whether the power is input to an actuator for the clutch. Connection of the clutch may sometimes fail even though the actuator is powered on, however. Because even in such instances the vehicle may keep running without causing considerable problems, this method of determination remains somewhat uncertain. There had been a proposal of an art for using a contactless sensor for example to detect positions of a clutch.

Japanese Patent Application Laid-open No. 2006-46594 discloses a related art.

SUMMARY

This disclosure relates to a slide flange incorporated and used in an element having a clutch, such as a free-running differential, of a drivetrain for a vehicle for example, and in particular to a slide flange used with a pair of proximity sensors to enable simultaneous detection of both disconnection of the clutch and the number of revolution. During vehicle stops, connection of the clutch does not cause a problem in general, as both clutch teeth stand still. While the vehicle is moving, however, a difference in revolution speed is often created between the clutch teeth and therefore there may be some difficulty in connecting the clutch. It is thus necessary to, before connecting the clutch, detect revolution speeds of the respective clutch teeth and thereby perform control that enables a connection only when the difference in speed is smaller than a suitable threshold. In measuring revolution speeds of a propeller shaft and an axle respectively for example, it could be possible to indirectly evaluate revolution speeds of the clutch teeth respectively connected thereto, but this is not a direct means, of course.

In light of the above problems, the device described below has been created, which can detect whether the clutch is connected or disconnected and detect the revolution speeds of the clutch teeth simultaneously.

According to an aspect, a slide flange is used with a rotary body having a clutch rotatable about an axis and a pair of proximity sensors apart from each other in a circumferential direction. The slide flange is comprised of: an inner ring portion fitting on the rotary body and movable in a direction along the axis from a first position where the clutch gets connected to a second position where the clutch gets disconnected; an outer ring portion unitarily elongated from the inner ring portion and so disposed as to at least at the second position face the pair of proximity sensors; a plurality of notches formed on the outer ring portion at even intervals in the circumferential direction; and a coupling portion elongated from the outer ring portion toward the rotary body, the coupling portion being so coupled with the clutch as to rotate the outer ring portion along with the clutch.

DESCRIPTION OF EMBODIMENTS

Exemplary embodiments will be described hereinafter with reference to the appended drawings.

Throughout the following description and the appended claims, an axis means a rotational axis of a rotary body unless otherwise described. Further, while right and left may be sometimes discriminated in the following description, this is merely for the convenience of explanation and therefore does not limit embodiments.

A slide flange according to the present embodiment is applicable to any rotary body having a clutch, which is included in a drivetrain for a vehicle, and examples thereof are a power transfer unit (PTU), a free-running differential and a limited-slip differential for example. In the description given below, a free-running differential is exemplified but is not limiting the embodiments of course.

Figure 1:
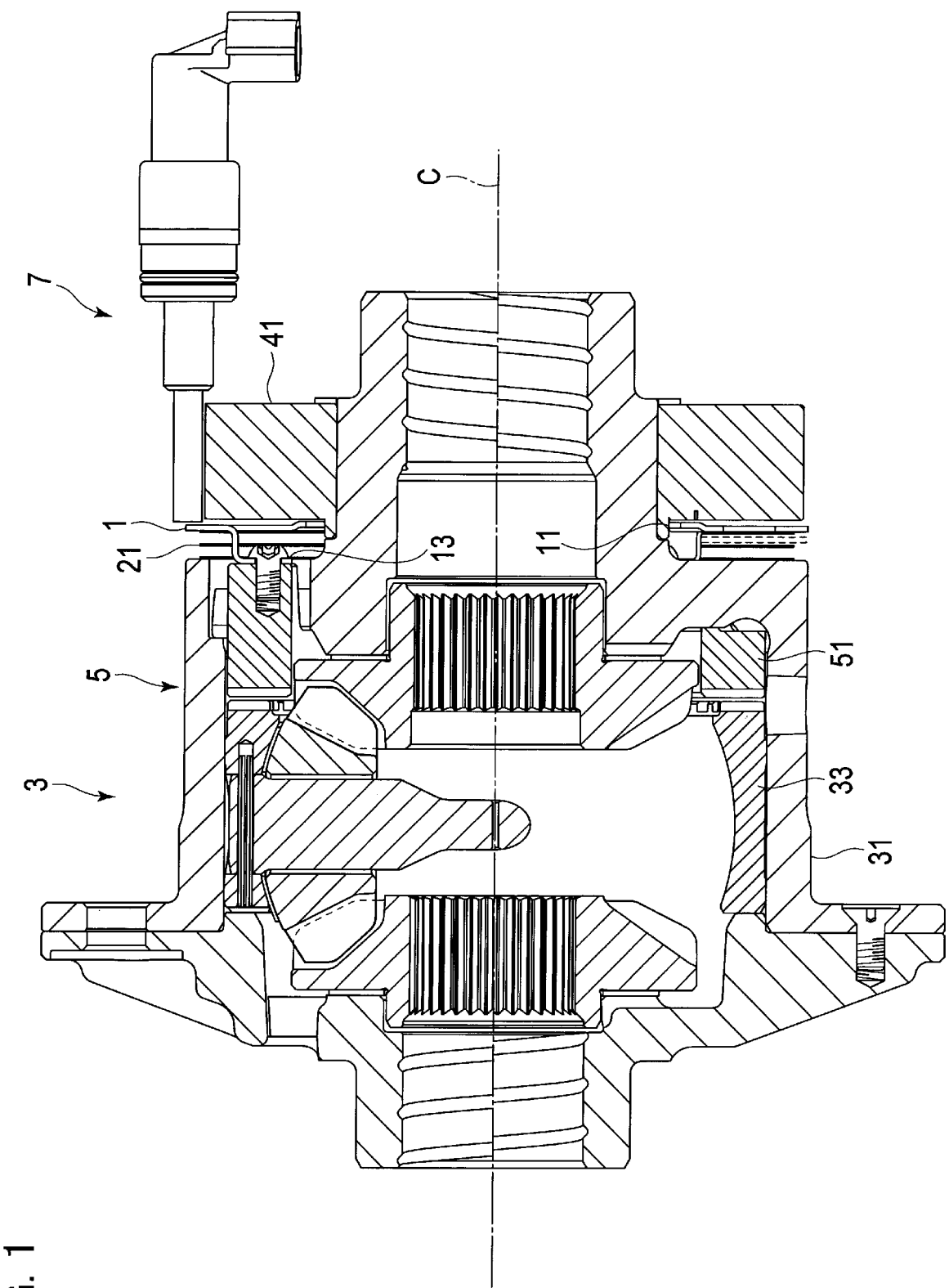
FIG. 1 is an elevational view in which a sectional view of a free-running differential, a clutch and a slide flange and an elevational view of a proximity sensor are combined, according to an embodiment.

Referring to FIG. 1, a slide flange 1 of the present embodiment is used with a free-running differential 3 including a clutch 5 and a pair of proximity sensors 7. The free-running differential 3 is rotatable about an axis C and the pair of proximity sensors 7 is disposed close to the outer periphery thereof. The pair of proximity sensors 7 is apart from each other in the circumferential direction and has a suitable span therebetween.

The free-running differential 3 includes an outer casing 31 receiving torque from an engine and an inner casing 33 rotatable relative thereto. The inner casing 33 is combined with a differential gear, which is further coupled with right and left axles, thereby allowing differential motion between these axles.

When the clutch 5 gets disconnected, as the inner casing 33 is drivingly separated from the outer casing 31, the axles freely rotate. When the clutch 5 gets connected, as the inner casing 33 receives the torque via the clutch 5 from the outer casing 31, the axles are driven by the engine.

Figure 2:
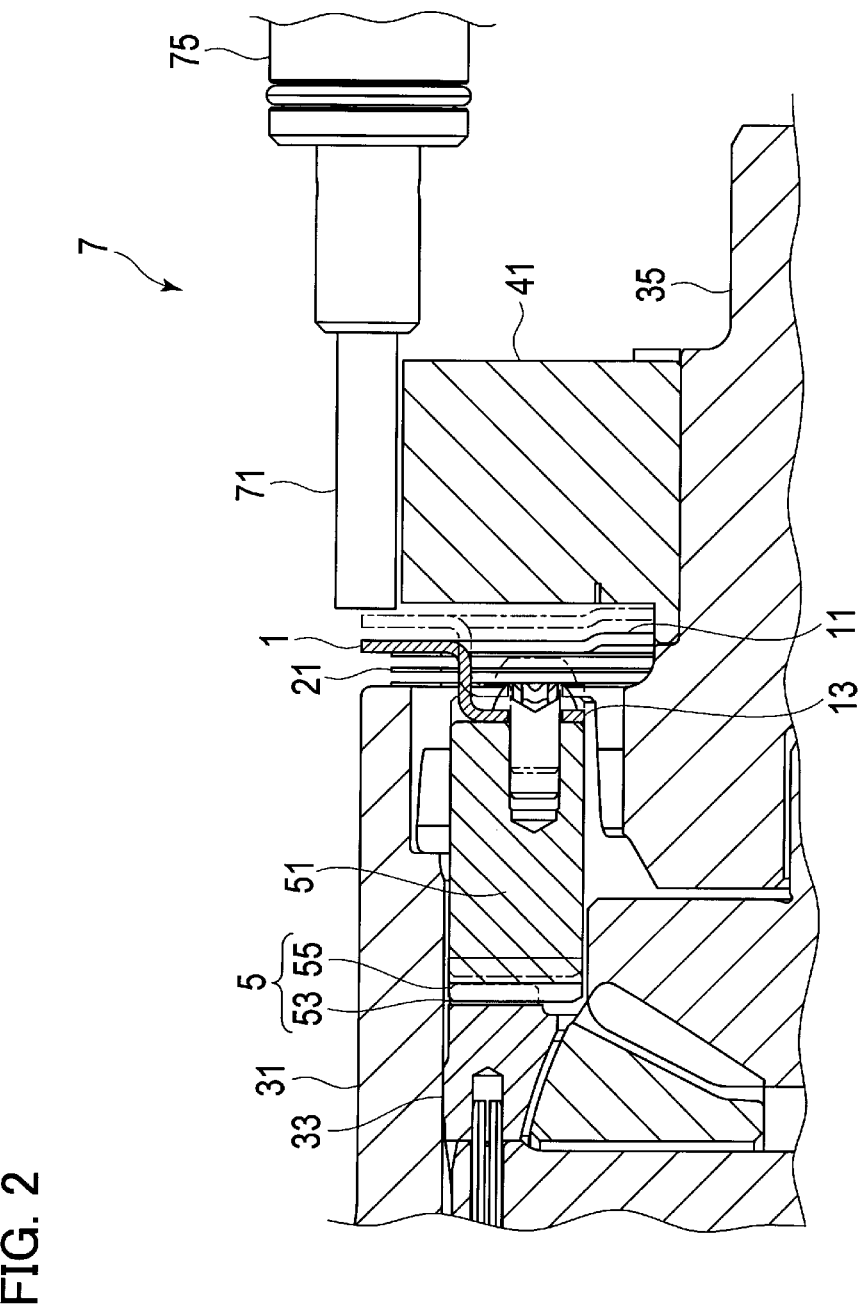
FIG. 2 is a sectional elevational view illustrating an enlarged view of the slide flange and elements therearound.

Referring to FIG. 2 in combination with FIG. 1, within the outer casing 31 a clutch ring 51 is housed generally formed in a ring-like shape. An end of the inner casing 33 opposed to the clutch ring 51 is provided with clutch teeth 53, and correspondingly the clutch ring 51 is provided with clutch teeth 55, so that the combination of the clutch teeth 53 and 55 constitutes the clutch 5.

The clutch ring 51 is movable in the direction along the axis C in the outer casing 31, and, at an end opposite to the end having the clutch teeth 55, engages with the outer casing 31 to rotate along therewith. At the end at issue, the clutch ring 51 is exposed out of the outer casing 31 and is coupled with the slide flange 1 by means of a bolt or the like.

The slide flange 1, as being coupled with the clutch ring 51, moves together with the clutch teeth 55, and therefore whether the clutch 5 is connected or disconnected can be determined by detecting the position of the slide flange 1. At a first position indicated by a solid line in FIG. 2, the clutch 5 is connected, and at a second position indicated by a chain line, the clutch 5 is disconnected. The pair of proximity sensors 7 is so disposed as to be not responsive to the slide flange 1 at the first position but produce an output in response to access of the slide flange 1 at the second position.

The free-running differential 3 is further provided with an actuator 41 for driving the clutch ring 51 in the direction along the axis C. The actuator 41 fits on one of boss portions 35 of the outer casing 31, for example. The actuator 41 is in general a stationary member that does not rotate along with the outer casing 31; however, it may rotate along therewith if possible. The actuator 41 can be a solenoid that is electrically magnetized but any suitable device such as a hydraulic device, a pneumatic device or a gear-cam mechanism is instead applicable thereto.

The actuator 41, via the slide flange 1, drives the clutch ring 51. Alternatively, a plunger may be elongated from the actuator 41 toward the clutch ring 51 and the actuator 41 may thereby directly drive the clutch ring 51. In a case where the actuator 41 is a solenoid, the slide flange 1 can be, at least in part, made of a magnetic material such as a low-carbon steel so as to be driven by magnetic flux.

To return the slide flange 1 to the initial position, a compression spring 21 may be interposed between the slide flange 1 and the outer casing 31.

Figure 3A:
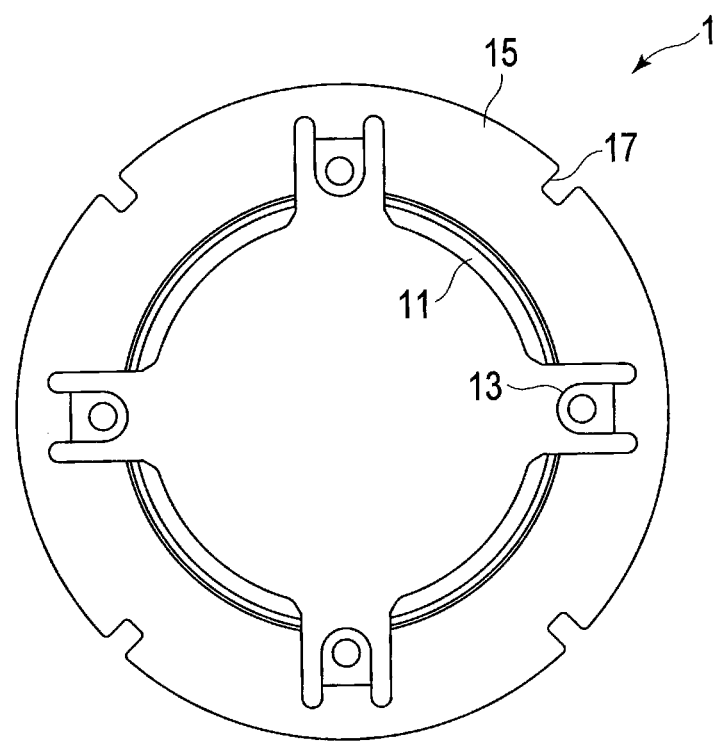
FIG. 3A is a side view of the slide flange viewed from the side of an actuator.
Figure 5A:
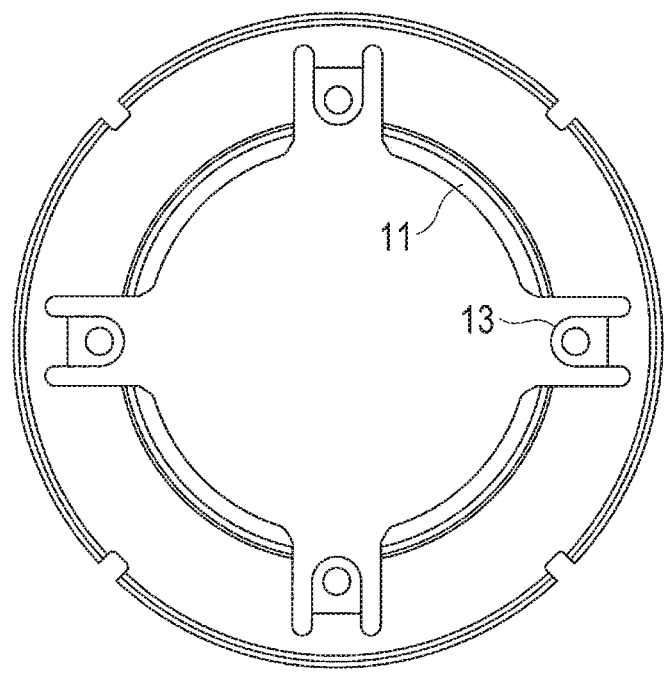
FIG. 5A is a side view of a slide flange according to another example viewed from the side of an actuator.

Referring to FIG. 3A, the slide flange 1 is in general a flat plate and also formed in a ring-like shape, and, at its internally peripheral portion (inner ring) 11, movably fits on the boss portion 35 of the free-running differential 3, for example. The inner ring 11 may not be necessarily continuous along the circumferential direction. The slide flange 1 is, outwardly beyond the inner ring 11, provided with an outer ring 15, as a unitary body therewith or as a separate body coupled therewith. The outer ring 15 is formed in a circular shape projecting outward so as to steadily face the proximity sensors 7 while it rotates about the axis C. The outer ring 15 can be larger in diameter than the inner casing 33 and yet larger in diameter than the actuator 41. Further, aside from the notches 17 described later, it forms a circumferentially continuous circle. As shown in FIG. 3A, it may be a circular disk perpendicular to the axis C or a part of a conical face oblique at a small angle thereto, or further alternatively can be a cylinder in parallel with the axis C as shown in FIG. 5A.

Any arbitrary material is applicable to the outer ring 15. In a case where sensors using magnetism, such as Hall generators, are applied to the proximity sensors 7, however, it is required to apply a magnetic material such as a low-carbon steel, at least partly, to the outer ring 15.

Figure 4A:
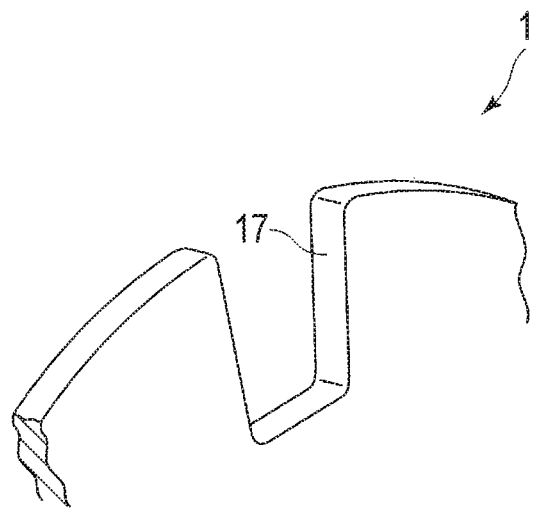
FIG. 4A is a perspective view of the slide flange, which shows an enlarged view of a notch thereof and its vicinity.
Figure 4B:
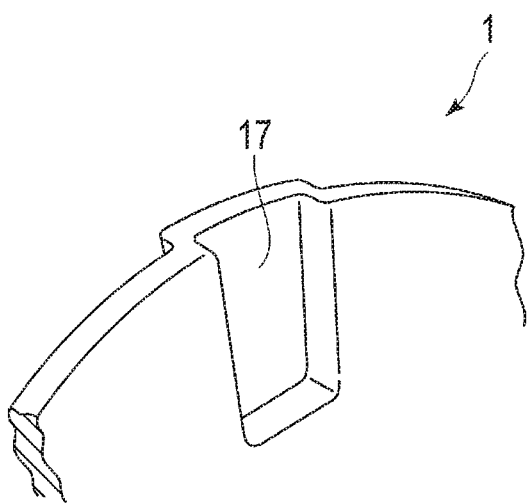
FIG. 4B is a perspective view which shows an enlarged view of a notch and its vicinity according to another example.

Referring to FIGS. 4A, 4B, the outer ring 15 is provided with a plurality of notches 17 formed at even intervals in the circumferential direction thereof. These notches 17 are to be used for measuring revolution speed although details thereof will be described later.

Each notch 17 may be either a hollow cut as shown in FIG. 4A or a bottomed depression as shown in FIG. 4B. The number of the notches 17 may be four as shown in FIGS. 3A, 5A but may be instead more or less than four. The interval between adjacent notches 17 should be, however, determined in connection with the interval between the proximity sensors 7 as described later.

Figure 3B:
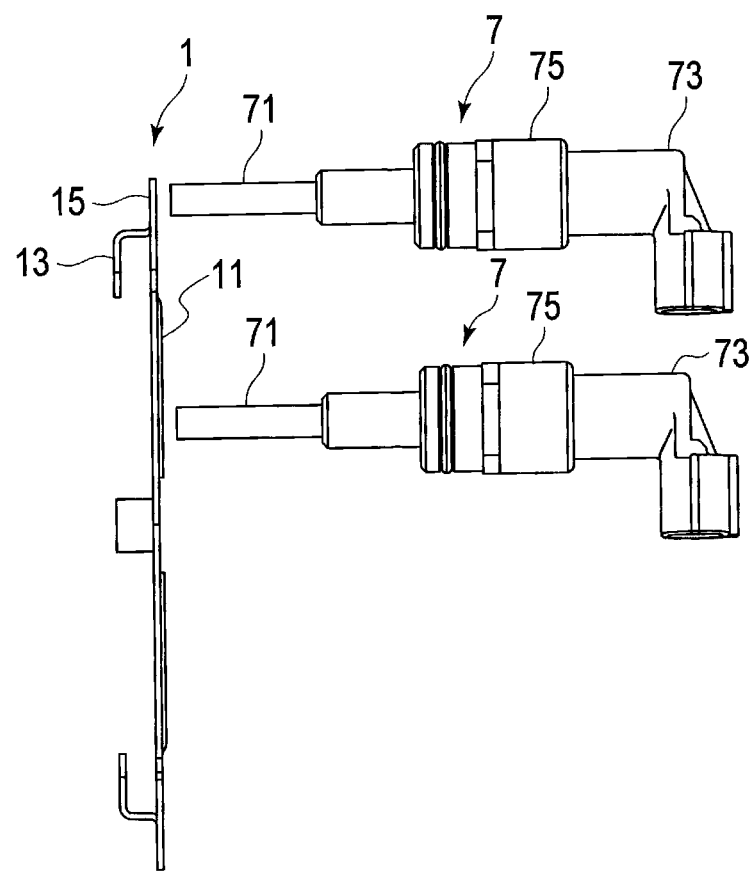
FIG. 3B is an elevational view that shows only the slide flange and a pair of proximity sensors.
Figure 5B:
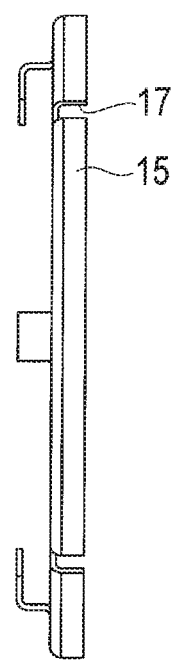
FIG. 5B is an elevational view of the slide flange according to another example.

Referring to FIG. 1 and FIGS. 3B, 5B in combination with FIGS. 3A, 5A, the slide flange 1 is provided with one or more coupling portions 13 projecting toward the clutch ring 51. The coupling portions 13 are tabs, in which plural portions on the outer ring 15 of the slide flange 1 are partly bent and projected to respectively form these tabs, and may respectively have through-holes for allowing bolts to pass therethrough. Alternatively, the coupling portions 13 may be cut and raised from the inner ring 11. Yet the plurality of coupling portions 13 may be arranged symmetrical with each other about the axis C and this arrangement creates effects of making forces acting on the clutch ring 51 be symmetrical and thereby smoothing its movement. These coupling portions 13 are used for coupling with the clutch ring 51 and thus the outer ring 15 rotates along with the clutch ring 51.

Figure 6:
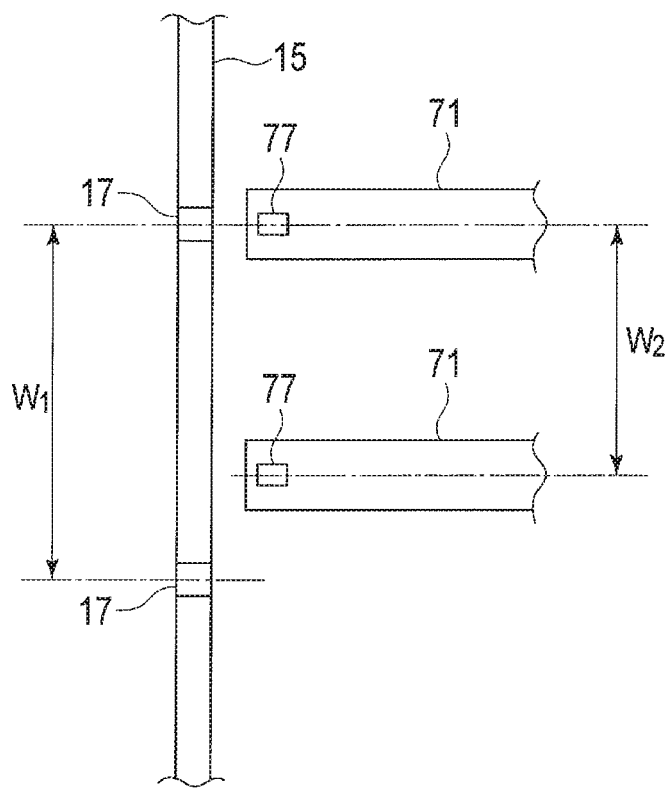
FIG. 6 is a schematic view showing a relation between the notch and the pair of proximity sensors in which these elements are developed in the circumferential direction.

Referring to FIG. 3B in combination with FIG. 6, each proximity sensor 7 typically takes a bar-like form, which houses in its head 71 a sensor device 77 and is provided with a connector for extracting signal therefrom at its proximal end portion 73. Each proximity sensor 7 is fixed to the vehicle body by means of its midway portion 75 typically so as to make the head housing the device close to the outer ring 15. Each proximity sensor 7 may be directed parallel to the axis C while this can be applied to a case where the outer ring 15 is a disk perpendicular to the axis C. Or, each proximity sensor 7 may be directed in a radial direction while this may be advantageous to a case where the outer ring 15 is a cylinder parallel to the axis C as shown in FIG. 5B.

To each proximity sensor 7 applicable is a Hall generator, for example. The Hall generator is an electric device that outputs potential difference between electrodes in response to applied magnetic flux and can be used for detecting proximity of a magnetic material. While the Hall generator, if used alone, produces continuous output depending on a distance from the magnetic material, it could be used in combination with an IC that converts it to discrete pulse output depending on whether it is greater or smaller than a threshold. This is effective in cancelling influence by magnetic field created by the adjacent actuator 41. Still alternatively, in place of the Hall generator, any suitable proximity sensor of an induction type, a capacitance type, or an optical type may be applicable. A threshold distance in detecting proximity is 3 mm (millimeters) for example.

Figure 7:
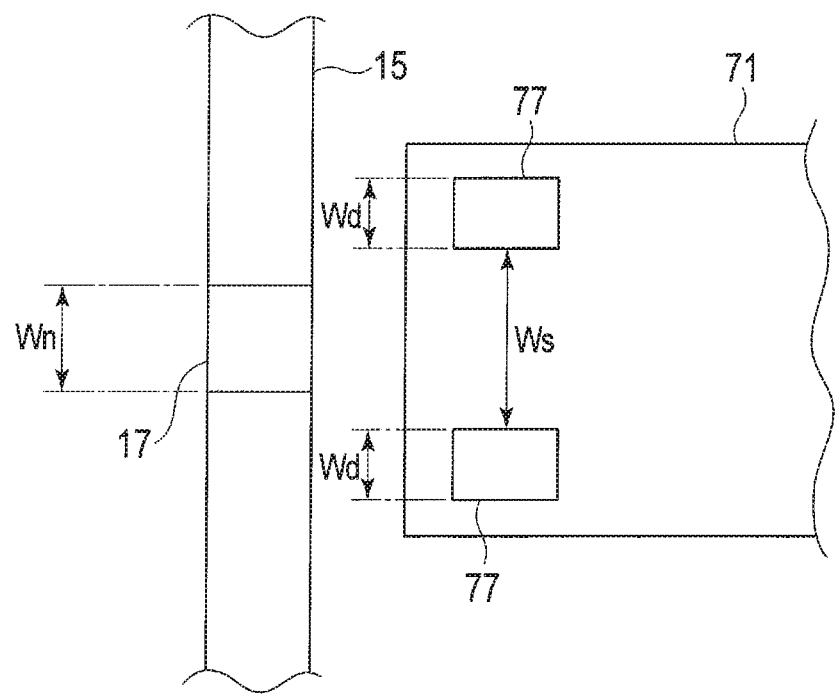
FIG. 7 is a schematic view showing a relation between the notch and the proximity sensors according to another example, in which these elements are developed in the circumferential direction.

The slide flange 1 is used in combination with not a single proximity sensor 7 but a pair of proximity sensors 7. This is advantageous because, even if one of the proximity sensors 7 happens to come close to one notch 17, the other sensor 7 ensures detection of proximity of the slide flange 1. Or, as shown in FIG. 7, a single head 71 may be provided with a pair of devices 77. This gives the appearance that a single proximity sensor is combined with the slide flange 1. Also in this case, the same effects can be enjoyed.

Dimensions of the pair of devices 77 and a distance therebetween can be set in a particular relation with dimensions of the notches 17 and intervals therebetween. Specifically, referring to FIG. 6, if the distance W2 in the circumferential direction between the pair of devices 77 is an integral multiple of the intervals W1 in the circumferential direction between the notches 17, both the devices 77 can simultaneously come close to the notches 17. To avoid this case, preferably the distance W2 is not an integral multiple of the intervals W1 and more preferably the distance W2 is smaller than the intervals W1.

Referring to FIG. 7, the pair of devices 77 has a span Ws therebetween. If the width Wn of each notch 17 is greater than the span Ws, both the devices 77 may come opposed to one notch 17. To avoid this case, preferably the width Wn is smaller than the span Ws. On the other hand, if a width Wd that is a minimum width to allow each device 77 to detect a notch is greater than the width Wn, it causes trouble in detection of existence of the notch 17 by the device 77. To avoid this case, preferably the detection width Wd is smaller than the width Wn.

The present embodiment enables the pair of proximity sensors 7 to electrically and without contact detect whether the clutch ring 51 is at the first position (the clutch 5 is connected) or at the second position (the clutch 5 is disconnected). Specifically, referring to FIG. 8, as the slide flange 1 is sufficiently apart from the proximity sensors 7 when the clutch ring 51 is at the first position, the outputs F(t) from the pair of proximity sensor 7 are both 0 (OFF). As it comes closer to the proximity sensors 7 than the threshold when the clutch ring 51 is at the second position, the outputs F(t) represent the values of 1 (ON). Supposed that one of the pair of proximity sensors 7 faces one of the notches 17 of the slide flange 1, the other must face any portion other than the notches 17 of the outer ring 15. Thus at least one of the pair of proximity sensors 7 must create the output of ON.

Figure 8:
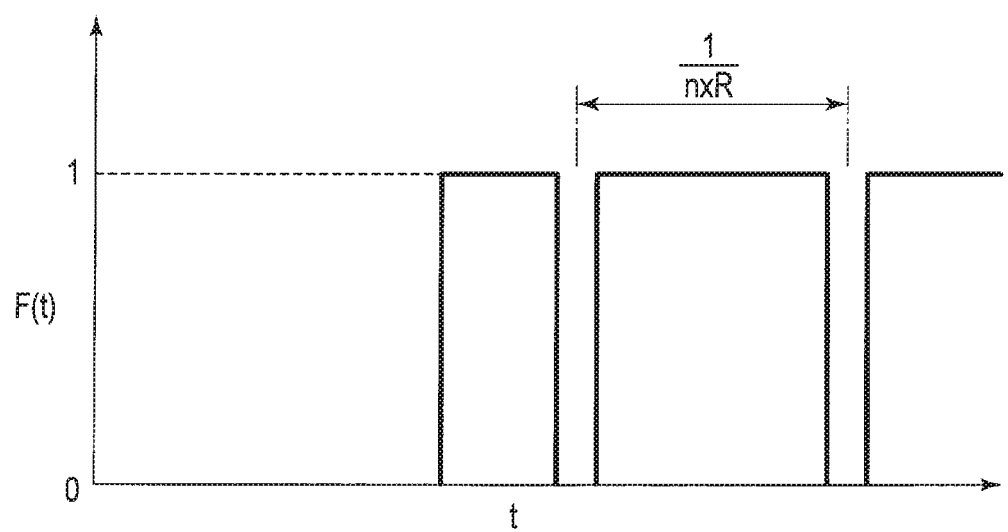
FIG. 8 is a graph schematically showing an output from the proximity sensors.

When the clutch 5 gets disconnected while torque acts on the outer casing 31, the clutch 51, as following the outer casing 31, also rotates. If this revolution fails to synchronize with that of the inner casing 33, the clutch teeth 53, 55 create difference in revolution speed and therefore the clutch 5 cannot be made connected again. According to the present embodiment, while the slide flange 1 rotates along with the clutch ring 51, the notches 17 cyclically pass through the front of the proximity sensors 7. The proximity sensor 7, while having continued to output ON, only then outputs OFF and therefore creates pulses as shown in the right of FIG. 8. As the number n of the notches 17 is in advance known, by measuring the time t between pulses, the revolution speed R of the clutch teeth 55 can be calculated.

Specifically, the present embodiment enables direct detection of the revolution speed of the clutch teeth 55, thereby enabling control in which connection of the clutch 5 is allowed only when the difference in revolution speeds between the clutch teeth 53, 55 is below the threshold.

It should be noted that the slide flange 1 is apart from the pair of proximity sensors 7 when the clutch 5 is connected and then the proximity sensors 7 cannot output pulses corresponding to the revolution. According to the general knowledge of persons skilled in the art, the proximity sensors are not used for the purpose of detecting the revolution speed when the distance to the subject is not constant. In the use of this embodiment, the proximity sensors are nevertheless useful because the revolution speed is necessitated only when the clutch 5 is disconnected.

Further, as described already, the fact that the subject of detection has a notch can impede the proximity sensors from detecting the position of the clutch. The present embodiment, however, solves this problem by using the paired proximity sensors 7 in combination.

Specifically, the present embodiment makes it possible to detect whether the clutch is connected or disconnected and detect the revolution speeds of the clutch teeth simultaneously, electrically and without contact.

In any detection method necessitating contact, energy loss by friction is not negligible and another problem would occur because forces on the point of effort and the point of action create the moment of force. The present embodiment solves these problems.

Unlike in the prior art, it is not necessary to provide the device with another detection device for revolution speed in order to estimate the revolution speeds of the clutch teeth. Specifically, the present embodiments can omit additional detection devices indispensable in the prior art with retaining its function, and contributes toward simplifying the structure of the rotary machines.

Although certain exemplary embodiments are described above, modifications and variations of the embodiments will occur to those skilled in the art, in light of the above teachings.

INDUSTRIAL APPLICABILITY

A slide flange that can determine whether a clutch is connected or disconnected and the revolution speed of clutch teeth simultaneously is provided.

The invention claimed is:

1. A slide flange for use with a rotary body having a clutch rotatable about an axis and a pair of proximity sensors apart from each other in a circumferential direction, comprising:
   an inner ring portion fitting on the rotary body and movable in a direction along the axis from a first position where the clutch gets connected to a second position where the clutch gets disconnected;
   an outer ring portion unitarily elongated from the inner ring portion and so disposed as to face the pair of proximity sensors at least at the second position;
   a plurality of notches formed on the outer ring portion at even intervals in the circumferential direction; and
   a coupling portion elongated from the outer ring portion toward the rotary body, the coupling portion being so coupled with the clutch as to rotate the outer ring portion along with the clutch.

2. The slide flange of claim 1, wherein the outer ring portion is a circular disk elongated radially from the inner ring portion and perpendicular to the axis, or a cylinder elongated in parallel with the axis from the inner ring portion.

3. The slide flange of claim 1, wherein the plurality of notches is so disposed as to make a distance in the circumferential direction between the pair of proximity sensors be not an integral multiple of the intervals in the circumferential direction between the notches.

4. The slide flange of claim 1, wherein a width of each of the notches is smaller than a span between the pair of proximity sensors.

5. The slide flange of claim 4, wherein a width of each of the notches is larger than a detection width of each of the proximity sensors.

* * * * *